United States Patent [19]

Kurple

[11] Patent Number: 6,025,452
[45] Date of Patent: Feb. 15, 2000

[54] LIGNIN BASED POLYOLS

[76] Inventor: Kenneth R. Kurple, 9533 Springborn Rd., Anchorville, Mich. 48004

[21] Appl. No.: 08/913,565

[22] PCT Filed: Dec. 27, 1996

[86] PCT No.: PCT/US96/20140

§ 371 Date: Aug. 25, 1997

§ 102(e) Date: Aug. 25, 1997

[87] PCT Pub. No.: WO97/24362

PCT Pub. Date: Jul. 10, 1997

[51] Int. Cl.⁷ ........................................................ B22C 1/20
[52] U.S. Cl. ............................ 527/301; 527/401; 523/142
[58] Field of Search .................................... 527/301, 401; 523/142

[56] References Cited

U.S. PATENT DOCUMENTS

| | | | |
|---|---|---|---|
| 3,519,581 | 7/1970 | Moorer et al. | 527/401 |
| 4,851,457 | 7/1989 | Kurple | 523/142 |
| 4,987,213 | 1/1991 | Hirose et al. | 527/301 |

*Primary Examiner*—Nathan M. Nutter
*Attorney, Agent, or Firm*—Woodling, Krost and Rust

[57] ABSTRACT

A lignin-polyol mixture is reacted with an isocyanate to produce a urethane material. The rate of the reaction is controlled by the sodium concentration in the lignin-polyol mixture. The lignin includes sodium and it is desirable to have the sodium at concentrations of less than 1% by weight of the lignin. Polyether and polyester polyol, are the preferred polyols in the lignin-polyol mixture.

14 Claims, No Drawings

LIGNIN BASED POLYOLS

BACKGROUND OF THE INVENTION

At the present time foams and urethane plastics are made by reacting a polyol with an isocyanate with a functionality of at least 2 (two) or greater. The polyol can be a polyester molecule which has at least a functionality of at least 2 (two) or greater. The polyol can also be a polyether polyol which is made by reacting propylene oxide or ethylene oxide with a molecule such as ethylene glycol or glycerine to produce molecules with various molecule weights, which have pendant hydroxyl groups which will react with difunctional or multifunctional isocyanates to produce a solid plastic or foam. However at present time in order to produce a rigid foam or a urethane plastic it is necessary to react one part polyol with one part isocyanate. This is because the isocyanate generally contains aromatic rings and this is what makes the foam rigid, as well as having a high crosslink density.

Also, a major disadvantage of these high levels of isocyanate is that when the foam is burned, high levels of toxic gases are produced which are generally derived from the isocyanate part of the molecule. It would be a tremendous advantage to be able to reduce the toxic fumes.

It has been discovered that by using the lignin molecule as part of the polyol portion the significant advantages result. One is that by using the lignin molecule in the polyol portion of the system the amount of isocyanate can be reduced 40% or more and still produce rigid foam, This reduces the amount of toxic gases that are derived from the isocyanate portion of the system.

The lignin molecule is a natural phenolic type molecule that occurs in wood, straw, sugar cane and other natural materials. Generally the majority of the lignin that is produced as a byproduct of the pulping process to make paper is just burned to recover heat value. In the United States alone over 50 billion pounds lignin are burned annually just for its heat value. Any lignin from the Kraft pulping process, sulfite pulping process, semi mechanical pulping process, thermomechanical pulping process, semi-chemical pulping process, solvent process, steam explosion pulping process and biomass pulping process can be used.

As part of this present invention it was discovered that certain lignins can function quite well as a polyol component for an isocyanate system, these lignins can be used at different levels in the system depending on what final properties of the system are desired.

The use of the lignin molecule also significantly improves the moisture resistance of a foam, in fact when the proper level of lignin is used in a urethane foam the urethane foam will be almost impervious to moisture even when in direct contact with moisture. Commercial foams made with the present polyols literally absorb moisture like a sponge. Another major advantage of using lignin as a part of the polyol system is the flame resistance of the finished foam or urethane foam of urethane plastic part. This is because lignin acts as a natural flame retardant. However one of the major aspects of this invention is that the lignin molecule becomes readily soluble in polyether polyol that is made from ethylene oxide.

This is very important because when a regular polyether polyol is made from just propylene oxide the resulting polyol does not readily solubilize the lignin molecule and in many cases phase separation results and does not produce a quality urethane foam or plastic product. We have found that ethylene oxide as a part of the polyol makes it possible to make these blends with lignin.

What has been discovered is that where current polyether polyols only have marginal solubility for various lignins this fact makes it very difficult to produce a high quality foam or urethane plastic part because the lignin will tend to phase separate when the isocyanate is added to the lignin polyol blend and this makes it very difficult to make consistent physical products.

Also one of the major aspects of this invention is that in order to make high quality urethane foams and plastic materials the amount of sodium or other caustic ions such as potassium that are present in the lignin can have a dramatic affect on the properties of the final urethane product. This is because it is a well known fact that materials that produce a basic PH in water can perform as very strong catalysts for the isocyanate hydroxyl reaction that produces the urethane linkage. Therefore if the sodium level is too high it will cause the reaction between the hydroxyl groups and isocyanates go too fast which can produce a very poor quality product. It was discovered and it is one of the major aspects of this invention to reduce the sodium level to levels that are low enough to make it possible to produce a useful product once the lignin based polyol has reacted with the isocyanate. Also high levels of sodium ions or other inorganic ions such as potassium will actually degrade the foam in time.

EXAMPLE I

In a suitable vessel use heat and or pressure to blend 300 parts of a lignin produced from a solvent pulping process and 700 parts of WL-440 (a polyether polyol that is made from a combination of propylene oxide and ethylene oxide) with agitation by using a suitable mixer and heat and higher pressure if necessary. This mixture can be heated to 200° F. to improve the rate of solution, the mixing is continued until a dark solution results. What results is a liquid material that has the following physical viscosity: 1532 centistrokes at 100° F. whose viscosity will depend on the particular lignin that is used.

EXAMPLE II

In order to make a thermosetting urethane part, 1.5 parts of the resin solution of Example I is mixed with 1 part of Rubinate R1840 (an ICI product) and poured into a mold and allowed to harden. The mold can be heated as in a compression mold and this will produce a very hard tough plastic. The hardness of the product will depend on the particular lignin used.

EXAMPLE III

In order to produce a foam, 2 parts of the lignin based polyol of Example I is premixed with 0.05 parts of water and 1 part Rubinate R1840 and then poured into a suitable container and a free rising foam will result.

EXAMPLE IV

In order to produce a low density foam, a blowing agent can be mixed with this lignin based polyol in example I. Therefore 2 parts of lignin based polyol of example I is premixed with 0.6 parts of Forane 141 b (1.1 dichloro-1-fluroethane), then this mixture is mixed with 1 part of Rubinate R-1840 and then poured into a suitable container and a free rising foam low density will result.

EXAMPLE V

In order to make a urethane coating based on the lignin based polyol of example I, one part of the lignin based polyol of example I is mixed with 1 part of suitable coating solvent depending on the coating application. Then this premix is mixed with 1 part Rubinate R-1840 and the resulting mixture is used to coat a variety of substances. The viscosity of this resulting mixture can be adjusted with suitable solvents depending on the final coating application.

It is understood to those skilled in the art that Kraft lignin or other type lignin may be employed.

What is claimed is:

1. A composition comprising ligning a polyol, and an isocyanate, said lignin having sodium, said lignin being mixed with said polyol, said lignin-polyol mixture being reacted with said isocyanate producing a urethane foam, a urethane plastic or other urethane material.

2. A composition as claimed in claim 1 wherein said polyol is a polyether polyol.

3. A composition as claimed in claim 2 wherein said polyether polyol is made from ethylene oxide.

4. A composition as claimed in claim 1 wherein said polyol is a polyester polyol.

5. A composition as claimed in claim 1 wherein said lignin is derived from a solvent pulping process.

6. A composition as claimed in claim 1 wherein said lignin is derived from the Kraft paper pulping process.

7. A composition as claimed in claim 1 wherein said lignin is derived from a biomass process.

8. A composition as claimed in claim 1 wherein said lignin is derived from a mechanical pulping process.

9. A composition as claimed in claim 1 wherein said lignin is derived from a sulfite paper pulping process.

10. A composition as claimed in claim 1 wherein the lignin is derived from a semi-mechanical pulp.

11. A composition as claimed in claim 1 wherein said lignin includes sodium and said sodium is less than 500 parts per million parts of lignin.

12. A composition as claimed in claim 1 wherein said lignin-polyol mixture contains less than 2% ash by weight.

13. A composition as claimed in claim 1 wherein said lignin-polyol mixture contains less than 2% inorganic ions by weight.

14. A composition as claimed in claim 1 wherein said lignin-polyol mixture contains less than 2% sodium by weight.

* * * * *

UNITED STATES PATENT AND TRADEMARK OFFICE
CERTIFICATE OF CORRECTION

PATENT NO.    : 6,025,452
DATED         : February 15, 2000
INVENTOR(S)   : Kenneth L. Kurple It is certified that error appears in the above-identified patent and that said Letters Patent is hereby corrected as shown below:

Column 3,
Line 10, delete "ligning", and insert -- lignin,--

Signed and Sealed this

Twelfth Day of March, 2002

Attest:

JAMES E. ROGAN
*Director of the United States Patent and Trademark Office*

*Attesting Officer*